(12) United States Patent
Hatzack et al.

(10) Patent No.: US 8,414,819 B2
(45) Date of Patent: Apr. 9, 2013

(54) METHOD AND DEVICE FOR MACHINING A TEAT RUBBER DURING PRODUCTION

(76) Inventors: Wilfried Hatzack, Turkheim (DE); Jakob Maier, Turkheim (DE)

( * ) Notice: Subject to any disclaimer, the term of this patent is extended or adjusted under 35 U.S.C. 154(b) by 0 days.

(21) Appl. No.: 12/449,136

(22) PCT Filed: Jan. 22, 2008

(86) PCT No.: PCT/EP2008/000472
§ 371 (c)(1),
(2), (4) Date: Dec. 4, 2009

(87) PCT Pub. No.: WO2008/089962
PCT Pub. Date: Jul. 31, 2008

(65) Prior Publication Data
US 2010/0148402 A1 Jun. 17, 2010

(30) Foreign Application Priority Data
Jan. 24, 2007 (DE) .......................... 10 2007 003 480

(51) Int. Cl.
*B29C 41/42* (2006.01)
(52) U.S. Cl.
USPC .......................................................... 264/334

(58) Field of Classification Search .................... 264/334
See application file for complete search history.

(56) References Cited

U.S. PATENT DOCUMENTS
2010/0109199 A1* 5/2010 Krishnan et al. .............. 264/334

FOREIGN PATENT DOCUMENTS
JP 61262112 * 11/1986
WO WO9934664 * 7/1999

* cited by examiner

*Primary Examiner* — Larry Thrower
(74) *Attorney, Agent, or Firm* — Fattibene and Fattibene, LLC; Paul A. Fattibene (57) ABSTRACT

During the production of teat rubbers, in particular of teat rubbers containing a high percentage of silicone, pressure is applied when the teat rubber preforms are removed, the radial expansion of teat rubber areas being appropriately limited to a maximum value. Hence, the removal can be executed automatically and at a comparatively high temperature without irreversible damage being caused to the material. The removal process can be supported by an appropriate contact surface whose contour corresponds, at least partially, to the outer contour of the preform. Furthermore, an appropriate removal device is provided.

17 Claims, 6 Drawing Sheets

METHOD AND DEVICE FOR MACHINING A TEAT RUBBER DURING PRODUCTION

FIELD OF THE INVENTION

The present invention relates in general to the field of mechanical milking of dairy animals and in particular to the production of teat rubbers which are to be applied to the teats of the animals in automatic or semi-automatic milking processes.

BACKGROUND OF THE INVENTION

Modern agriculture is determined by high pressure of competition which is further intensified by the increasing globalization. In particular in dairy farming great value is therefore placed on high profitability in the production of milk. For this purpose, however, it is particularly important to aim at a certain degree of automation in the production of milk and therefore allow attending to a huge stock of animals with a not excessively large amount of staff. Furthermore, the quality of the gained milk must have a high standard and it is also essential that the respective national and international regulations regarding the quality of the milk are carefully observed. A very important aspect of achieving a permanently high yield of milk is to be seen in keeping the health of the animals in a herd at a high level, so that, in the long run, the highest possible yield of milk can be obtained from every single animal.

During increasing automation in attending to a great number of milk animals certain milking methods have become accepted in the past, which, on the one hand, aim at allowing to attend to and therefore also milk a great number of animals with a small amount of staff being required and, on the other hand, provide surroundings for the animals which are as optimal as possible to ensure the health of the animals in the log run. For this purpose, so-called milking robots are used in many large agricultural farms where, for example, the milking process is almost fully automated, so that normally more than two milking processes per day can be accomplished on one individual animal, the number of persons required being low. On other farms, a semi-automatic milking strategy is applied, which involves the use of so-called milking parlours where certain activities are carried out or at least supervised by the staff, and merely the milking process itself is almost fully automated.

Depending on the process strategy, the milking process itself is normally carried out such that after a certain stimulation phase a negative pressure is generated at the respective teat, so that milk flow occurs, with a massage action interrupting the milking flow at regular intervals being typically carried out. To this end, pressure from outside is applied to the teat at regular intervals, so that a certain backward flow of blood and lymph takes place during this phase and also appropriate pressure conditions are generated at the teat, which at least roughly imitate the natural sucking behaviour of a calf. The milking function and, in part or completely, the function of stimulation before, during and after the actual milking process are executed in a controlled manner with the aid of a milking equipment, which has respective teat cups, with the support of a qualified person or completely automatically. The individual teat cups are normally implemented as rigid cups backed on the inner side with an elastic material, the so-called teat rubber. Hence, the teat rubber is in direct contact with the teat of the animal and thus, in a certain way, represents an "interface" between animal and machine. Therefore, the teat rubber must have a plurality of properties to comply with the requirements occurring in automated milking, viz. the teat rubber must first of all allow appropriate pressure conditions to be obtained under the teat to start the desired milk flow. Hence, the teat rubber must be adapted to be slipped on the teat on the one hand and, nevertheless, must generate a sufficiently high leak tightness at the teat bottom to thus allow the generation of the desired negative pressure.

Furthermore, in the desired periodic interruption of the milk flow and the resultant massage action, there must be a sufficiently high elasticity to ensure folding in or collapsing of the teat rubber below the teat. This is accomplished by applying (pressurized) air to the outside of the teat rubber. In this connection, frequencies of approximately 0.2 to 2 Hz are normally obtained, so that throughout its service life the respective material of the teat rubber is to accomplish a multitude of folding processes with almost equal behaviour. Furthermore, the teat rubber must, all in all, show a good cleaning behaviour, since nucleation must be suppressed to the highest possible degree, so that bacteria will be prevented from being transmitted from one animal to the other to a very large extent. Furthermore, the material must be as inert as possible from a chemical view-point, so that material will not be separated into the milk and, hence, the high standards in terms of hygiene and quality will be observed.

As a result of the many criteria to be met by a teat rubber, a plurality of material mixtures is presently in use; normally, appropriate polymer materials are employed in the production of teat rubbers. Therefore, the diverse materials can produce very different results with respect to durability, efficiency as regards high yield and particularly with respect to the health of the animals. In particular, with regard to the last-mentioned aspects, consistency and material properties proved to be important characteristics to increase the milking process efficiency. For instance, relatively soft materials, for example, silicone mixtures, are advantageous for a high yield and milk health, since a contact area that is comfortable for the animal or an "interface" between animal and machine in the milking process can be created in this way. Hence, respective mechanical strain as well as the resultant hardening and pathological change of the teat can be suppressed significantly in contrast to relatively hard rubber mixtures.

As a result of the many different requirements to be met by a teat rubber, teat rubbers in use must be exchanged relatively often, so that efficient production methods are required in which the teat rubbers are produced efficiently in great number and with constantly high quality. The teat rubbers are normally produced from a polymer material mixture under pressure and heat on the basis of an appropriate mould by means of an injection moulding process. In this manufacturing process, the corresponding material mixture is heated and thus assumes a viscous state and, under a relatively high pressure, the latter is injected into a corresponding mould where, after a certain curing time, a respective preform of the teat rubber is formed which is then removed from the mould and subjected in a suitable manner to a finishing treatment so as to obtain the final state of the teat rubber. To achieve an appropriately efficient production of the teat rubber, material mixtures are frequently used, which allow an efficient manufacturing process, particularly during the removal of the still hot preform. Normally, harder material mixtures allow a better handling, since they are of a higher mechanical stability. In the processing of material mixtures resulting in a relatively soft teat rubber, e.g. silicone teat rubbers, the removal of the teat rubber preform from respective components of the injection mould is a critical process, since an excessive mechanical strain or any other form of excessive deformation can result in an irreversible modification of the material of the preform and can thus make the teat rubber unusable. For allowing a wide range of different material mixtures and particularly soft mixtures of material, which can be advantageous in the use of the teat rubbers, to be efficiently processed in the production process, suitable measures are therefore required to avoid, as far as possible, irreversible modifications of the teat rubber material after the injection moulding and before the finishing treatment.

SUMMARY OF THE INVENTION

With respect to the above-mentioned problem, a method of producing teat rubbers is provided according to one aspect of the present invention, said teat rubber having a head area and an adjoining tubular area. The method comprises the steps of forming a preform of the teat rubber from a heated polymer material mixture by means of a mould, and removing the preform from a mould element which determines, at least partially, the inner contour of the teat rubber. The removal is accomplished by introducing a pressurized fluid into the tubular area and by simultaneously limiting a radial expansion of the tubular area, caused by the fluid pressure, to a predetermined range.

Making use of this measure, the teat rubber preform can therefore be acted upon by the pressurized fluid from inside and thus be separated from the respective mould element to a certain degree, without any risk of an irreversible deformation of the material in the tubular area of the teat rubber. Since the respective elastic limits of the various material mixtures are well known, or can be ascertained, a suitable range for a maximum radial expansion of the tubular area can be selected individually according to requirements, so that a large number of very different polymer material mixtures and, in particular, very soft mixtures of materials can be processed efficiently.

In a further advantageous embodiment, limiting of the radial expansion is effected by providing a sleeve enclosing the circumference of the tubular area, at least partially, with a specified gap before the fluid is introduced. By using a sleeve an accurately adjustable range can very efficiently be achieved for the desired radial expansion during the introduction of the pressurized fluid. It follows that, by arranging sleeves with different dimensions, different requirements of the various material mixtures can be complied with in a simple manner, so that the processing of very hard and also very soft polymer material mixtures, viz. the removal of respective moulded parts, is possible. In other illustrative embodiments, the radial expansion during pressure application is accomplished by other suitable limiting surfaces, which are arranged around at least the tubular area such that a relatively large area of the expanding outer surface of the tubular area is covered. However, respective spaces between individual portions of the limiting surface may also be formed, whose size is, however, dimensioned such that an excessive expansion of the tubular area material will not occur in these small spaces.

According to a further illustrative embodiment, the removal of the preform comprises bringing a part of the preform into contact with a contact surface adapted to the contour of said part of the preform, and applying a pulling force by means of the contact surface. If necessary, a relatively high pulling force, e.g. in the range of some Newton up to some 100 Newton, can be applied in this manner so as to remove the preform, a high adhesion and/or a suitable frictional connection being achieved by the contoured contact surface.

According to a further illustrative embodiment, the contact surface constitutes part of the inner surface of the sleeve limiting the radial expansion. Hence, the contact with the inner surface of the sleeve resulting from the application of pressure to the interior of the tubular area can advantageously be utilized to simultaneously increase the non-positive connection occurring between the outer surface of the expanding tubular area and the inner surface. A reliable removal behaviour is achieved in this way, even if relatively long tubular areas, which are completely or in part injected onto the respective mould element, are produced.

In another embodiment, the radial expansion is limited to 20 mm or less. An irreversible deformation can be prevented for a great group of polymer material mixtures by means of such a limitation of the maximum range of expansion. Advantageously, the radial expansion is adjusted in this connection to 0.5 mm or more, so that a reliable separation of adhering tubular areas as well as of the head area from the mould element can be accomplished. As a consequence, the adhesion of the preform to the element of the injection mould determining the inner contour of the teat rubber can be reduced significantly, so that the removal can then be carried out successfully.

A further advantageous embodiment is so conceived that, for improving the sealing characteristics, at least an end portion of the tubular area is mechanically fixed in the radial direction during introduction of the fluid. Hence, by additionally mechanically fixing the end portion, the appropriate working pressure of the fluid to be introduced can be selected relatively high, so that the adhesion to the mould element will efficiently be reduced. Mechanical fixing can be achieved, for example, by bringing into contact appropriate pressure surfaces or by a suitable shape of a respective nozzle for introduction of the pressurized fluid, as will be described hereinafter in more detail.

Mechanical fixing in radial direction further allows an additional axial force to be applied to the end portion which, at the same time, also leads to a compression of at least the tubular area, so that, due to the elastic properties, widening occurs to a certain degree and contributes to a better separation of the mould element.

In a further advantageous embodiment at least the head area has force applied thereto by a gripping unit during introduction of the fluid. By this application of an appropriate force the effect produced by the pressurized fluid in the head area so as to reduce the adhesion to the mould element can be enhanced clearly, because, for example, an appropriate flow path of the fluid through the tubular area in the head area and out of this area can be produced. On the basis of the resultant flow of the fluid, the further separation of the head area is supported still further, so that a reliable removal of the entire preform can be achieved.

A further advantageous embodiment is so conceived that, for introducing the pressurized fluid, a nozzle provided with a sealing surface is moved to the end portion of the tubular area and pressed onto said end portion. By introducing the fluid in this manner, e.g. the contact force of the nozzle can be adjusted individually, irrespectively of other mechanical components used for performing the method according to the present invention, so that also the sealing behaviour of the nozzle upon introduction of the fluid can be enhanced. In particular, the sealing surfaces, in co-operation with the contact force, allow the application of relatively high working pressures and thus even larger preforms or strongly adhering preforms can be separated from the mould element. For instance, by process fluctuations occurring during the moulding of the preform, higher adhesion may occur in some preforms, but, as a result of the high adjustable working pressure, a reliable removal will nevertheless be possible. For instance, after a comparatively long down time or interruption during the injection process, minor temperature fluctuations can occur in the course of the process, which, in the case of appropriate material mixtures, will then find expression in increased adhesion. Hence, changes in the removal behaviour caused by temperature fluctuations or other process fluctuations are efficiently compensated by the possibility of applying a high working pressure of the fluid.

In a further embodiment the step of baking out the teat rubber preform for adjusting the final material characteristics is performed after the removal process. An appropriate procedure can efficiently be performed, since the preform, which is ready for removal after injection and which is, in this state, extremely sensitive to mechanical deformation due to the not yet stabilized molecular structure, can efficiently be removed from the mould and can then be subjected to the tempering process. A great number of preforms can then be processed simultaneously. In this manner, the throughput rate of the process for the production of the teat rubber can substantially be adjusted to the cycle predetermined by the injection moulding unit and thus to the capacity of the latter, since appropriate finishing treatments in the injection mould for stabilizing the preform are not required for enhancing the removal process.

According to an advantageous embodiment, the polymer material mixture is a silicone mixture, since the latter has particularly advantageous characteristics during the use of the teat rubber, as has been described hereinbefore. It follows that even sophisticated material mixtures, whose characteristics are soft and therefore favourable for animal health and for the efficiency of the milking process, can be processed in an efficient manner, i.e. with a high throughout and with high quality.

According to one embodiment, the preform has a temperature of 150° C. or more during the removal process. It follows that, on the basis of this temperature range, the removal process can already take place in a phase immediately after injection moulding, since, due to the limitation of the radial expansion, the high sensitivity to mechanical deformation occurring at high temperatures of the preform can effectively be compensated for. This allows a reduction of the throughput time, whereby system utilization can be improved, which will also lead to a reduction of the overall cost.

According to another advantageous embodiment, the method comprises the steps of controlling the fluid pressure and an axial force in such a way that a predetermined range will be observed for these values. The control of these two parameters thus allows an efficient adaptation to various operating conditions, which may occur e.g. due to fluctuations in the preceding moulding process and/or due to different polymer material mixtures.

According to another advantageous embodiment, the method comprises the steps of examining whether the preform has been removed successfully, and repeating the removal process, if the preceding removal process should have failed. In this way, the reliability of the whole production process can be improved substantially, since the removal process in question will be repeated in the case of failure, so that, even after an unsuccessful first attempt, the respective part of the mould will again be available for the further production process within a very shot period of time.

According to another advantageous embodiment, at least the fluid pressure is increased during a repeated removal process, so that the strong adhesion of the preform material to the mould element will be overcome in an efficient manner so as to increase the likelihood that the subsequent removal process will be executed successfully.

According to another aspect of the present invention, a device for removing a teat rubber preform, which comprises a head area and a tubular area, is provided. The preform is placed, at least partially, on a mould element determining the inner contour of the teat rubber. The device comprises a removal unit provided with a contact surface which is to be brought into contact with the preform at least partially, and a fluid introduction means configured for introducing a pressurized fluid into the tubular area. Furthermore, the device comprises a limiting device for limiting the radial expansion of the tubular area upon introduction of the fluid.

Making use of this device a radial expansion of at least the tubular area can successfully be limited to a defined maximum value, so that an irreversible deformation of the material of the preform will be avoided, as has already been explained hereinbefore. It is thus possible to subject the preform, immediately after injection moulding, to reliable further processing so that, in combination with a suitable injection moulding system, the device according to the present invention will guarantee high throughout and high quality, since especially the critical removal process can reliably be executed at high temperatures in an automated manner.

According to another advantageous embodiment, the limiting device comprises a sleeve which encloses the circumference of the tubular area at least partially, so as to define a gap between the outer surface of the tubular area and an inner surface of the sleeve for limiting the radial expansion. The sleeve can be a comparatively stiff unit, which therefore predetermines a given diameter and, consequently, also a maximum radial expansion of the tubular area. In other embodiments, the sleeve can be an appropriate arrangement of respective contact surfaces, which, at least during the application of pressure to the tubular area, are moved to an appropriate position close to said tubular area so that an efficient limitation of the radial expansion is achieved.

According to an advantageous embodiment, the limiting device is configured for limiting the radial expansion to 20 mm or less. As has already been explained hereinbefore, a maximum expansion can be determined for a large range of material mixtures, so that a high degree of flexibility can be accomplished when the respective polymer material mixtures are processed. In other embodiments, the limiting device is implemented such that the radial expansion can be predetermined in an individually adjustable manner. This also allows different dimensions of the teat rubber to be taken into account. To this end, e.g. a large number of suitable sleeves having fixedly predetermined dimensions and a fixedly predetermined structure can be provided, which are then installed in a suitable manner, or the limiting device is provided with suitable contact surfaces which can be arranged at an adjustable distance from the tubular area, so that different requirements can be complied with.

In accordance with an advantageous embodiment, the sleeve is provided with gas outlets which substantially prevent the formation of gas bubbles between the inner surface of the sleeve and the material of the tubular area during radial expansion of the tubular area. Hence, the material of the preform can cling to the inner surface of the sleeve, so that a high total adhesion can be accomplished between the preform and the sleeve. The gas outlets can have an arbitrary suitable shape, and may e.g. be provided in the form of holes, gap-shaped elements and the like. In some embodiments, the effective area of the gas outlets is dimensioned such that a noticeable "bulging" of the preform material into the gas outlet in response to application of the fluid pressure will be avoided, whereas other embodiments are so conceived that, due to a suitable selection of the area of the openings for given process parameters and characteristics of the preform, the material will bulge to a certain degree so that the preform will "interlock" with the limiting surface. It is thus possible to accomplish a very intensive mechanical coupling between the preform and the limiting device, whereby the removal process will be supported effectively. The dimensioning of the size of the gas outlets can be determined by an appropriate test method in which the degree of bulging and the reversibility of the deformation of the preform are examined for various different preforms and operating conditions for the removal process.

According to another advantageous embodiment the limiting device is provided with a surface which comes into contact with the tubular area during a radial expansion of said tubular area and which has adhesion or friction-supporting surface characteristics. A strong adhesion can thus be achieved between the limiting surfaces of the limiting device and the tubular area, when pressure is applied to the interior of the preform. The improved adhesion can then be used advantageously for supporting the removal process.

According to another advantageous embodiment, the limiting device additionally comprises a nozzle which is axially movable relative to the mould element, so that the fluid can also be introduced into the tubular area under comparatively high pressure. In the case of one embodiment, the contact force of the nozzle, which is axially movable relative to the mould element, can be adjusted as regards the contact between the nozzle and the tubular area, so that appropriately high operating pressures can be used, which also allow a removal of comparatively large or long teat rubbers. For example, teat rubbers can be produced efficiently, in the case of which a part of the milk hose, which projects beyond the teat cup, is formed integrally with the teat rubber. It is nevertheless possible to accomplish an efficient removal or separation from the respective parts of the mould. Especially in cases where soft polymer material mixtures, e.g. silicone mixtures, are used, a very strong adhesion will be obtained in connection with the heated mould element. Due to the high operating pressure of the introduced fluid, this strong adhesion can, however, be reduced efficiently.

According to another advantageous embodiment, the surface which comes into contact with the tubular area constitutes part of the contact surface used for generating an axial force. Due to the fact that the surface of the limiting device is used not only for limiting the radial expansion but also as part of the contact surface, the contour of which may therefore also partly correspond to that of the outer surface of the preform, an efficient non-positive connection can be accomplished so as to allow removal. In particular in the case of large or long teat rubbers, it will be advantageous to use a large-area contact surface for executing a more efficient removal of the preform.

According to another advantageous embodiment, the contact surface comprises at least a first contact surface region for contacting a head area of the preform and a second contact surface region for contacting an end portion of the preform. On the basis of this structural design, the head area of the preform, which will normally adhere to an end plate of the injection mould such that it is flush therewith, can be deformed slightly during and/or after the application of the pressurized fluid, so that an adequate fluid flow path will be created in this way, which leads away from the head area and which will then support the complete separation of the preform material. In addition, an efficient introduction of the fluid can be accomplished by the contacting of the end portion, since the sealing characteristics in this area can be improved in this way.

In accordance with an advantageous embodiment, the first contact surface region is defined by the surface of jaws of a first gripping means and the second contact surface region is defined by the surface of jaws of a second gripping means. By providing first and second gripping means, a mechanically efficient contact will be established, and it is also possible to use cost-efficient and well-proven structural designs.

According to an advantageous embodiment, a third contact surface region is provided, which is arranged between said first and second contact surface regions in the longitudinal direction of the tubular area. In this way, the axial force required for removing the preform can be distributed more effectively over the entire length of the preform so that also teat rubbers of comparatively great length can be processed efficiently.

In accordance with an advantageous embodiment, the contour of the inner surface of the sleeve, i.e. of the device limiting radial expansion, corresponds, at least partially, to the contour of the preform to be removed. On the basis of this structural design, a frictional connection will be accomplished over a very large area when the material expands radially, so that, all in all, also stronger axial forces can be applied in the removal process. To this end, the inner surface of the sleeve may be patterned in a suitable manner, so that a strong frictional connection will be accomplished in connection with the elastic preform material clinging thereto. In other cases, the sleeve may be lined with suitable materials so that an appropriately strong adhesion and/or friction will be developed in interaction with the material mixture of the preform.

In accordance with another preferred further development, the device is configured for removing a plurality of preforms at the same time. The throughput of the system can in this way be increased in a suitable manner.

According to another preferred embodiment, a control unit is additionally provided, which is configured for maintaining the fluid pressure and a pulling force, applied during the removal process, within a specified range. It follows that, by means of said control unit, a precisely defined operating condition can be maintained. The control unit is, for example, also able to cause various operating conditions for the removal process, if this should become necessary due to process fluctuations and/or different material mixtures during the preceding work step, so as to compensate different adhesion characteristics during the removal.

In accordance with another preferred embodiment, the control unit is additionally configured for identifying a non-removed preform and for executing a specified correction function automatically. In this way, the whole sequence of manufacturing steps for the teat rubber can be executed in an automated and therefore extremely economical manner, since the specified correction function can be specified such that the overall system will only be influenced to a minor extent. For example, an appropriate alarm function can be provided, so that an operator of the system will be informed. In the case of one embodiment, the correction function includes a repetition of the removal process. In the course of this repetition, different operating parameters may be used for the removal, so as to accomplish now a reliable separation of the preform material from the mould element. If necessary, it is also possible to use operating parameters which may perhaps impair the preform, but which allow a reliable removal of the preform. For example, at least the fluid pressure can be increased so as to successfully remove a strongly adhering preform. Since the removal process in question will normally be significantly shorter than the respective process for producing the preform, the automatic repetition of the removal process will only contribute to a minor increase in the total throughput time, so that, even if failures should occur during the removal process, a high overall efficiency of the system in its entirety will be possible.

Other advantageous embodiments, features and objects of the present invention can also be gathered from the detailed description, the drawings and the attached claims following hereinbelow.

BRIEF DESCRIPTION OF THE DRAWINGS

Additional embodiments will now be described in more detail with reference to the attached drawings, in which.

DETAILED DESCRIPTION OF THE PREFERRED EMBODIMENTS

Figure 1A:
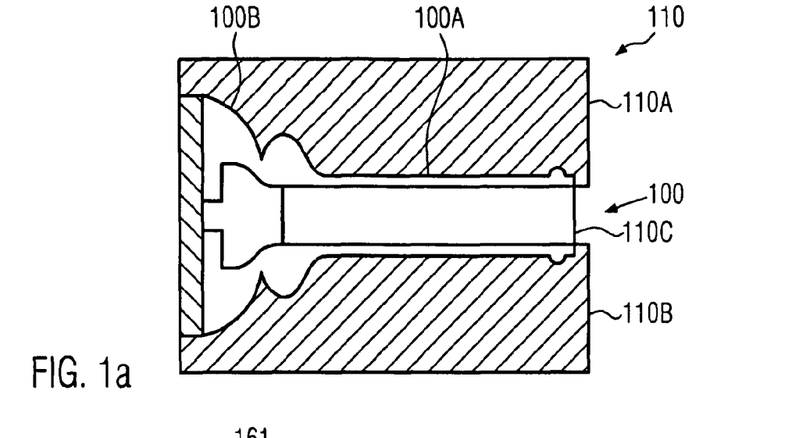
FIG. 1a shows a schematic cross-sectional view of a teat rubber preform, which is produced on the basis of a suitable mould and which is to be removed from at least one respective mould element in a subsequent work process.

FIG. 1a shows schematically a sectional view of an injection mould 110 having formed therein a preform 100 of a teat rubber consisting of a suitable polymer material mixture. The mould 110 is e.g. a component of a respective injection system in which the desired polymer material mixture is processed or prepared for introduction into the mould 110. For the sake of simplicity, the system in question is not shown. The mould 110 can have an arbitrary suitable structure for defining a desired size and shape of the preform 100. In particular, the mould 110 can comprise appropriate mould halves 110a, 110b representing substantially the outer contour of the preform 100, whereas an appropriate mould element 110c defines the inner contour of the preform 100. It should be pointed out that the mould halves 110a, 110b can be implemented e.g. as half shells or as cylinders, which are arranged around the mould element 110c so as to define the final shape of the preform 100. It should also be pointed out that an arbitrary number of mould elements 110a, 110b can be provided and that they can have an arbitrary shape, provided that the desired size, shape and material strength of the preform 100 is accomplished.

During the production of the preform 100, a suitable polymer material mixture, which is selected specifically with respect to the desired properties of the teat rubber, is processed and introduced in the mould 110 under appropriate high pressure, said mould having possibly a high temperature. According to an advantageous embodiment, the polymer material mixture is a silicone mixture, which will result in an improved behaviour during the milking process, as has been explained hereinbefore. During introduction of the polymer material mixture into the mould 110, respective parameters, such as pressure and temperature, can be varied, as will be advantageous for reliably filling the cavity formed in the mould 110 for the special material mixture. Process times of from a few seconds to a few minutes may here be appropriate. When the predetermined process time has ended, at least the mould halves 110a, 110b will be removed automatically in a suitable manner, e.g. by opening respective gripper units and the like; depending on the structural design of the mould 110 and on the process strategy, also a part of the mould element 110c can be removed from a tubular area 100a, whereas a head area 100b of the preform 100 will normally continue to adhere to the mould element 110c.

Figure 1B:
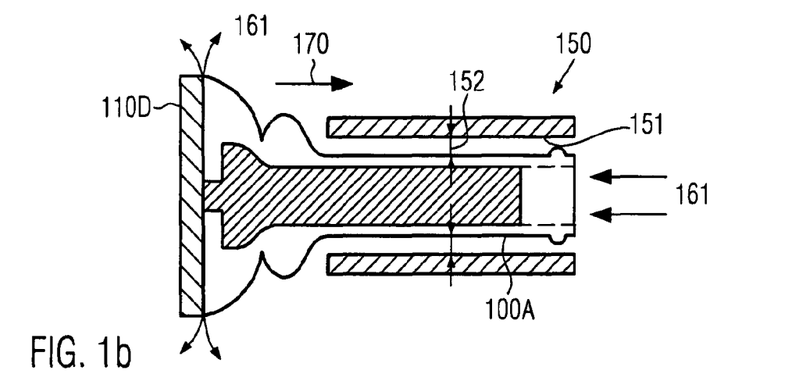
FIG. 1b shows a schematic cross-sectional view of the preform which is in the process of being removed from a mould element, the radial expansion of at least one tubular area of the teat rubber being limited according to the present invention.

FIG. 1b shows the preform 100 in a further process step; the preform 100 comprising the tubular area 100a and the head area 100b adheres at least to a part of the mould element 110c and must therefore be removed from the mould element 110c without any undesirable impairment of the material, i.e. part of the mould element 110c may have been removed already, as indicated by the dashed contour lines, so that the front part of the mould element 110c, which is shown as a hatched area, holds the preform 100. In other cases, the mould element 110c may be present during the removal in a substantially unchanged size. For this purpose, a suitable limiting device 150 is provided, which is implemented for limiting to a predetermined range a radial expansion or widening of at least the tubular area 100a, whose material is normally thinner than that of the head area 100b. To this end, the limiting device 150 is provided with suitably implemented, limiting surface areas 151 which, when the interior of the tubular area 100a has applied thereto a pressurized fluid 161, will come into contact with the expanding material of the preform 100, whereby further expansion will be prevented and an efficient separation of the material of the preform 100 from the mould element 110c will be effected. In the embodiment shown, e.g. an appropriate area or gap 152 can be seen, which predetermines a maximum expansion of the tubular area 100a. When soft polymer material mixtures are being processed, an application of the fluid 161 may have the effect that an extreme expansion occurs at least in certain parts of the comparatively thin-walled tubular area 100a, so that such soft polymer mixtures, e.g. silicone, are, in a conventional manner, normally not processed in respective automated systems immediately after moulding. The respective delimiting surfaces or surfaces 151 for limiting the area 152 for the maximum radial expansion are so designed that they surround at least large areas of the tubular area 100a, a continuous envelope being, however, not necessary. In particular, suitable openings may be provided, as will be explained in more detail hereinbelow, so as to avoid gas bubbles in the area 152 during expansion.

The surfaces 151 can be provided e.g. in the form of a suitable sleeve, e.g. in the form of a tube, the respective inner diameter of the sleeve defining in combination with the respective outer diameter of the preform 100 the area 152. Hence, various sleeves can be provided so as to allow for various sizes of the preform 100, or a single size for the area 152 can be chosen such that different preforms can be dealt with, without an irreversible deformation of the material occurring. For example, the size of the area 152 can be specified to be approx. 10 mm, whereby a total dimension of 20 mm is obtained; for many polymer material mixtures this will be a suitable value for avoiding an irreversible deformation in the case of standard diameters and material strengths of teat rubbers. The surfaces 151 may also be provided in the form of a plurality of surface elements, which, during the removal process, are arranged in a suitable manner in radially spaced relationship with the preform 100 so as to define a suitable area 152 in this way. It is not necessary to cover the whole area of the outer surface of the preform 100, provided that the respective non-covered areas of the tubular area 100a have lateral dimensions which prevent the material of the preform 100 from "bulging" when the fluid 161 is applied thereto. The surfaces 151 can, for example, be provided in the form of shell-shaped elements, e.g. two shell halves, which are suitably positioned during the process, the area 152 being adjustable to a certain extent by varying the respective distance in the case of some embodiments.

During the removal process, the interior of the tubular area 100a has applied thereto the pressurized fluid 161 after positioning of the surfaces 151 of the limiting device 150. Said fluid 161 can be an appropriate gas, e.g. pressurized air, or some other gas, e.g. nitrogen, for achieving by means of said gas a separation from the mould element 110c. In the case of some embodiments, the fluid 161 can also be provided in the form of a liquid, provided that the limiting device 150 is operated in suitable surroundings, so that the fluid 161 flowing out can be discharged appropriately. When a soft material mixture is used in the preform 100, the outer surface of at least the tubular area 100a will, due to the high elasticity, be increasingly pressed against the surface 151 due to the incoming fluid 161, and this will also increasingly lead to a certain degree of separation of the material of the head area 100b from the respective part of the mould element 110c. For supporting the removal process and for generating a suitable fluid flow path leading out of the head area 100b, which normally adheres comparatively firmly to a respective end plate 110d of the mould 110, a few illustrative embodiments are so conceived that a suitable force is applied by a device which is generally designated by reference numeral 170 in FIG. 1b. This force, which is applied by said device 170 in a substantially axial direction, causes a minor degree of separation of the material from the plate 110d, i.e. deformation of the material on said plate 110d, so that the fluid 161 can there flow out and thus contribute to an additional, better separation from the mould element 110c. The device 170 can be used for continuing the application of the respective axial force so that the preform 100 can finally be separated completely from the mould element 110c. It follows that, after injection moulding, when the material of the preform 100 has still a comparatively high temperature, which may e.g. be higher than 150° C., said material will not undergo an irreversible deformation, so that the contour accuracy of the preform 100 will be preserved after the removal process and so that the final characteristics of the material can then be adjusted in a suitable manner during a subsequent treatment, e.g. by baking out. In view of the automated and careful process of removing the preform 100 from the mould element 110c, said mould element 110c can be used immediately afterwards for a further production process of another preform, so that a high total throughput rate of the system will be achieved, since especially the process of removal is typically executed much faster than the process of producing the preform 100, which may take a few 10 seconds up to a few minutes.

In the case of a few embodiments, the device 170 for applying the axial force is mechanically coupled to the limiting device 150 in a suitable manner, so that the non-positive connection occurring between the surface 151 and the material of the preform 100 in response to an expansion of the material of the tubular area 100a can advantageously be utilized for applying a stronger force during the removal, at least during the initial phase of the removal process, when the pressure prevailing in the interior of the tubular area 100a is still sufficiently high. The adhesion of the head area 100b to the mould element 110c can thus be overcome effectively. For this purpose, the surface 151 can be implemented in a suitable manner in such a way that an increased adhesion, i.e. friction, will occur, as will be described in more detail hereinbelow.

Figure 1C:
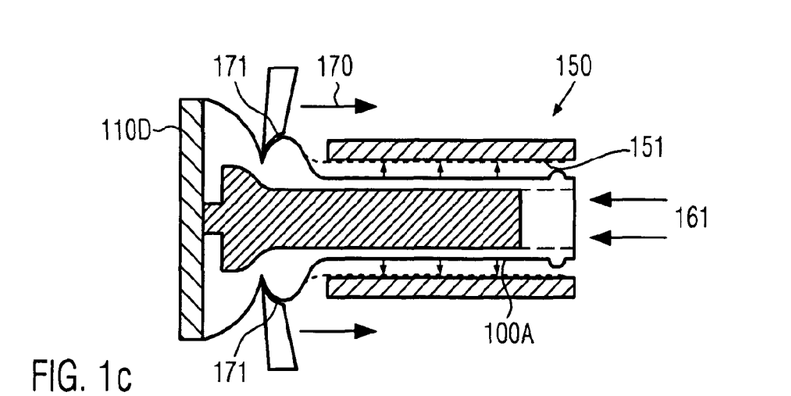
FIG. 1c shows a schematic cross-sectional view of the teat rubber preform which is in the process of being removed, a contact surface, which is partially adapted to the contour, being used for applying an axial force.

FIG. 1c shows a schematic representation of the preform 100 during the removal process, the device 170 being provided with appropriate contact surfaces 171 whose contour corresponds to that of the head area at least along a part of the latter. In the embodiment shown, in particular also the outer contour of the head area 100b is designed in such a way that a comparatively strong axial force can be transmitted during the removal of the preform 100. In addition, the surfaces 171, which substantially imitate the shape of the head area 100b, can be used for providing a comparatively large contact area and, consequently, a comparatively large force-application area, so that, on the one hand, undesirable damage can be avoided during contact with the head area 100b and so that, on the other hand, the desired high force will be available during the removal process. Furthermore, at least during the initial phase of the removal process, also the contact with the surface 151 can, as indicated by the broken line, contribute to an efficient non-positive connection between the preform 100 and the device 170, as has been explained hereinbefore.

Figure 1D:
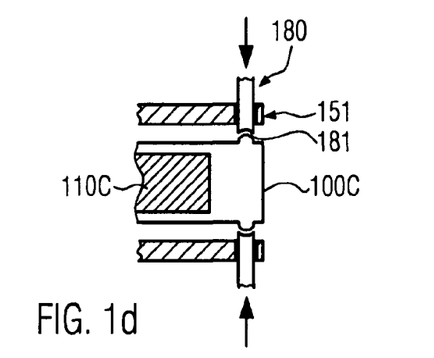
FIG. 1d shows schematically an end portion of the teat rubber contacting a respective gripping element according to one embodiment.

FIG. 1d shows a schematic representation of an end portion 100c of the preform 100, an additional device 180 being provided, which has respective surfaces 181 that can be brought into contact with the material of the preform 100. To this end, the surfaces 181 can have an arbitrary suitable shape; their shape can e.g. correspond to that of a possibly contoured surface design of the end portion 100c, so that, due to the effect produced by the device 180, a mechanical fixing of the end portion 100c will be accomplished. Due to the improved mechanical fixing of the end portion 100c, the fluid 161 can be introduced under a desired high pressure, since the leak tightness of the end portion 100c will be improved in spite of the pressure applied through the fluid 161. In an illustrative embodiment, the end portion 100c is therefore implemented in such a way that an efficient mechanical fixing of the surfaces 181 can be accomplished. This can be achieved by an appropriate configuration of the preform 100 and a suitable structural design of the surfaces 181.

Figure 1E:
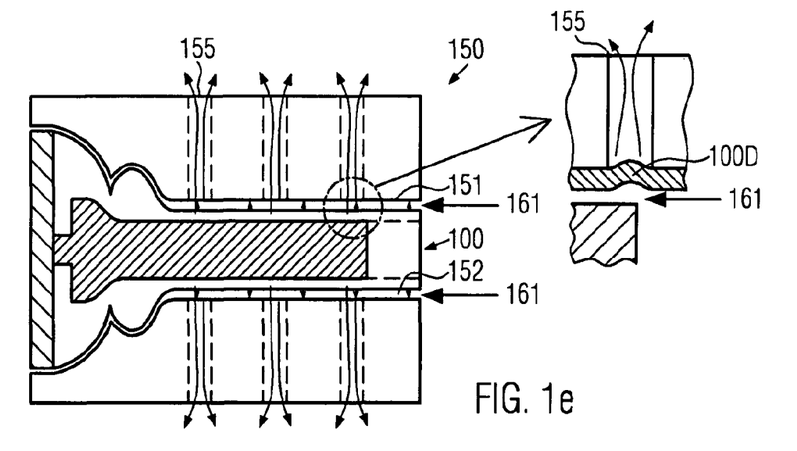
FIG. 1e shows schematically a limiting device for determining the maximum radial expansion of the tubular area according to another embodiment, in the case of which the contour of the limiting surface corresponds essentially to that of the teat rubber.

FIG. 1e shows a schematic representation of the preform 100 in combination with the limiting device 150 according to another embodiment. In this embodiment, the surfaces 151 for limiting the radial expansion of the preform 100 correspond to the outer contour of the preform 100 over large areas of the latter, so that the area 152 is provided in the region of the tubular area 100a, whereas in the region of the head area 100b a contact is established with the material of the preform 100, when no pressure is applied, or the spacing in question is much smaller so that a non-positive connection will be established during the removal process. In this way, a frictional connection between the limiting device 150 and the preform 100 will be accomplished over a very large area in response to an application of pressure, so that, in this case, the limiting device 150 can also serve as the device 170 for applying an axial force to the preform 100 in an efficient manner. It follows that, in this embodiment, the limiting device 150 can have a shape similar to that of the mould 110 (cf. FIG. 1a), but, other than in the case of the mould 110, an appropriate gap for producing the desired area 152 has to be provided in the tubular area 100a. In addition, suitable gas outlets 155 can be provided, so that the formation of gas bubbles during the expansion of the material of the preform 100 will be avoided to a very large extent, as has already been explained hereinbefore. According to other embodiments, the limiting device 150 is provided such that it extends over large areas of the preform 100, but it does not necessarily extend over the whole preform 100, provided that the necessary axial force can be transmitted to the preform 100 during the removal process. During the removal process, the limiting device 150 is, e.g. in the form of two semi shells, moved close to the preform 100 and is then closed in a suitable manner so that the fluid 161 can then be introduced under the desired pressure; simultaneously, an axial force can be executed by the limiting device 150 so as to support the separation of the preform 100 from the mould element 110c. By designing this embodiment of the limiting device 150 in the manner shown in FIG. 1e, also very long preforms 100 can reliably be removed from the respective mould element 110c, since the axial force that can be applied in combination with a high pressure is, in its entirety, very high. This is particularly advantageous in cases where the tubular area 100a comprises a tubular part which projects beyond standard teat cups, a mode of arrangement that can be used advantageously in many milking equipments. In this way, both the teat rubber and the milk hose following said teat rubber can be produced in one working process making use of a very soft material, e.g. silicone.

The device 150 according to FIG. 1e can, as has already been described in connection with the preceding embodiments of said device, be composed of a plurality of separate parts, which will then be united on the preform 100 in a suitable manner for the removal process, so that the preform 100 will be enclosed.

The enlarged detail in FIG. 1e shows the situation at one of the gas outlets 155 when the fluid 161 is being introduced, so that the material of the tubular area 100a is pressed against the surface 151 and into the gas outlet 155. This results in the formation of a bulge 100d which leads to an interlocking engagement with the surface 151. In this embodiment, the effective entrance area of the gas outlet 155 has been chosen such that the bulge 100d is formed for the special conditions in question, i.e. the pressure of the fluid 161, the thickness and the material strength of the polymer mixture of the tubular area 100a, the temperature of the latter, and the like, the deformation occurring being only of a reversible nature so that, after the removal process, the original shape will be reestablished. In the case of other embodiments, the size and the shape of the gas outlets 155, i.e. their entrance area, is chosen such that no bulge that would be worth mentioning is formed. The appropriate size and shape of the entrance area for avoiding an irreversible deformation can be ascertained by executing tests under various conditions. The gas outlets 155 may have an arbitrary shape and assume the form of e.g. gaps, holes, etc., provided that the above-mentioned conditions with respect to the bulge 100d are observed.

The above-explained aspects concerning the gas outlets 155 also apply to the embodiments which have already been described with reference to FIG. 1b to 1d as well as to all the other embodiments.

Figure 1F:
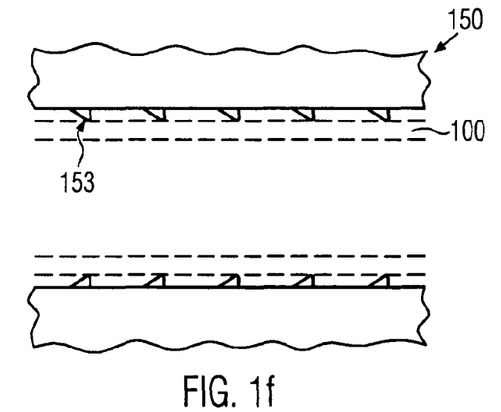
FIGS. 1f and 1g show a schematic cross-sectional view of a sleeve for limiting the radial expansion of the tubular area, the inner surface of the sleeve being provided with respective surface characteristics of such a nature that the adhesion to, i.e. the friction with the teat rubber material is improved without any damage being caused to the preform.
Figure 1G:
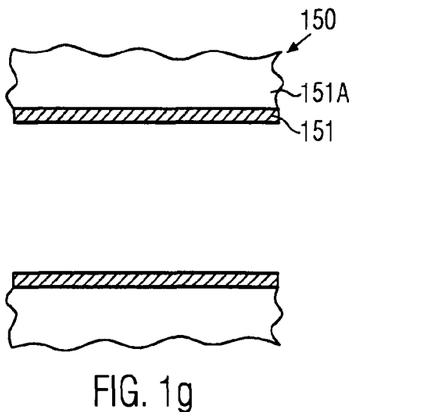

FIG. 1f shows a schematic representation of a cross-section of a part of the limiting device 150 according to an illustrative embodiment, in which the surface 151 is patterned in a suitable manner, e.g. by means of appropriate raised portions 153 and the like, so that, in total, an efficient non-positive connection is accomplished between the material of the preform 100 and the surface 151 when high pressure is applied. The respective surface topography, e.g. the raised portions 153, can be implemented in a suitable manner for allowing a high adhesion, i.e. friction for the material mixture to be processed, without causing any damage thereto. For example, a distinct surface topography may be provided for soft material mixtures, whereas an appropriate smooth surface will be provided for hard material mixtures.

FIG. 1d shows a schematic representation of a part of the limiting device 150, the surface 151 being here defined by a suitable material layer which, in combination with the material mixture of the preform 100, guarantees an appropriately high adhesion. This allows a high degree of flexibility in the selection of the "carrier material" 151a for the surface 151 for which an arbitrary material can then be used, without having to consider other characteristics, such as mechanical robustness, etc., since the carrier material 151a will provide the mechanical stability of the surface 151. It is, by way of example, also possible to provide different surface materials 151, e.g. in the form of thin tubes, etc., which are then inserted into the carrier tube 151 and secured in position, so as to allow for different material mixtures for the preform 100.

Figure 1H:
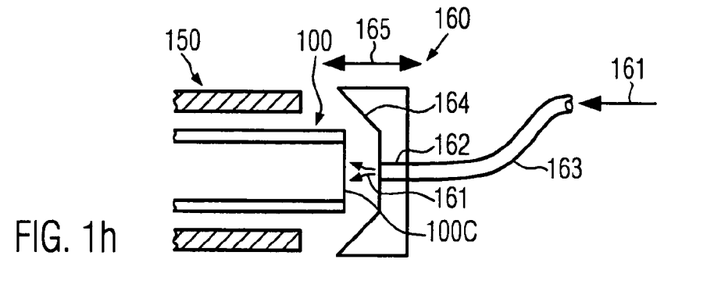
FIG. 1h shows a schematic cross-sectional view of a nozzle for introducing a pressurized fluid according to an illustrative embodiment.

FIG. 1h shows a schematic representation of the end portion 100c in combination with a device 160 for introducing the fluid 161 according to an illustrative embodiment. The device 160 for introducing the fluid 161 comprises, according to the present embodiment, a nozzle 162 which is connected to a suitable pressure reservoir (not shown) for the fluid 161 by means of a connection line 163. In the embodiment shown, the device 160 additionally comprises suitable sealing surfaces 164, which, when the pressurized fluid 161 is applied to the preform 100, accomplish a high degree of leak tightness, even if the end portion 100c should expand to a certain degree, i.e. the obliquely extending sealing surfaces 164 have the effect that an increasing counterforce will be generated in response to a pressure-induced expansion of the end portion 100c, so that good sealing characteristics will be obtained. In accordance with another illustrative embodiment, the nozzle 162, together with the respective sealing surfaces 164, is adapted to be moved mechanically relative to the end portion 100c in the axial direction designated by reference numeral 165, so that a contact force of the nozzle 162, i.e. of the sealing surface 164, can be adjusted in a suitable manner, irrespectively of the other components, e.g. the limiting device 150. It is thus possible to attach the sealing surface 164 with a suitable axial force to the end portion 100c during the removal process, and to introduce the fluid 161 under a suitably high pressure, the increased contact pressure guaranteeing a high leak tightness and, consequently, the maintenance of the high operating pressure. This allows an efficient removal also in the case of preforms having a comparatively high adhesion in view of their respective overall length or in view of process fluctuations of the preceding injection process. In particular, it is possible to adjust, in connection with an appropriate control unit, the contact force and/or the fluid pressure, so that the process can be adapted to different operating conditions in a flexible manner.

Figure 2A:
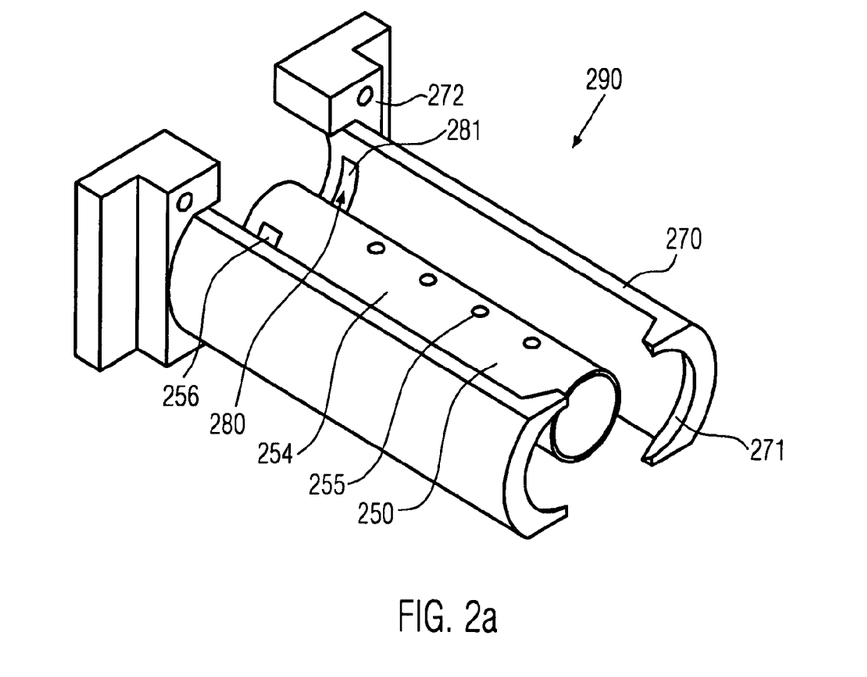
FIGS. 2a to 2c show a further embodiment of a part of a device for removing teat rubber preforms.

FIG. 2a shows a schematic perspective representation of a part of a device 290 for removing a preform from a component of the mould, said device 290 comprising at least some of the components which have been described hereinbefore with reference to FIG. 1a to 1h. The removal device 290 includes a removal unit 270 comprising, in the embodiment shown, two halves of a contoured surface 271, which serve as contact surfaces so as to establish a frictional connection with the material of the head area of the preform for applying thus an axial force for removing the preform, as has also been described hereinbefore. In the embodiment shown, the removal unit 270 is composed of two halves, which are mounted on suitable mechanical components 272 that allow a radial movement of the surfaces 271 and a respective axial movement. The mechanical components 272 can be realized by arbitrary suitable actuator components, such as pneumatic, hydraulic, electric or other components or combinations thereof. In addition, the device 290 comprises a limiting device 250 provided e.g. in the form of a tubular sleeve 254 having provided therein respective gas outlets 255, as has already been explained in connection with FIG. 1e. Furthermore, a gripping means 280 is provided, which, via respective surfaces 281, is adapted to be brought into contact with the end portion of a respective preform, the sleeve 254 of the limiting device 250 being provided with appropriate recesses 256 for this purpose. In addition, an appropriate fluid introduction means is provided, which cannot be seen in FIG. 2a. The fluid introduction means can be provided with a suitable nozzle which, in the embodiment shown, can e.g. be connected to the limiting device 250, whereas in the case of other embodiments a nozzle is provided, which allows a movement relative to the sleeve 254, as has been explained e.g. in connection with the fluid introduction device 160 in FIG. 1h.

Figure 2B:
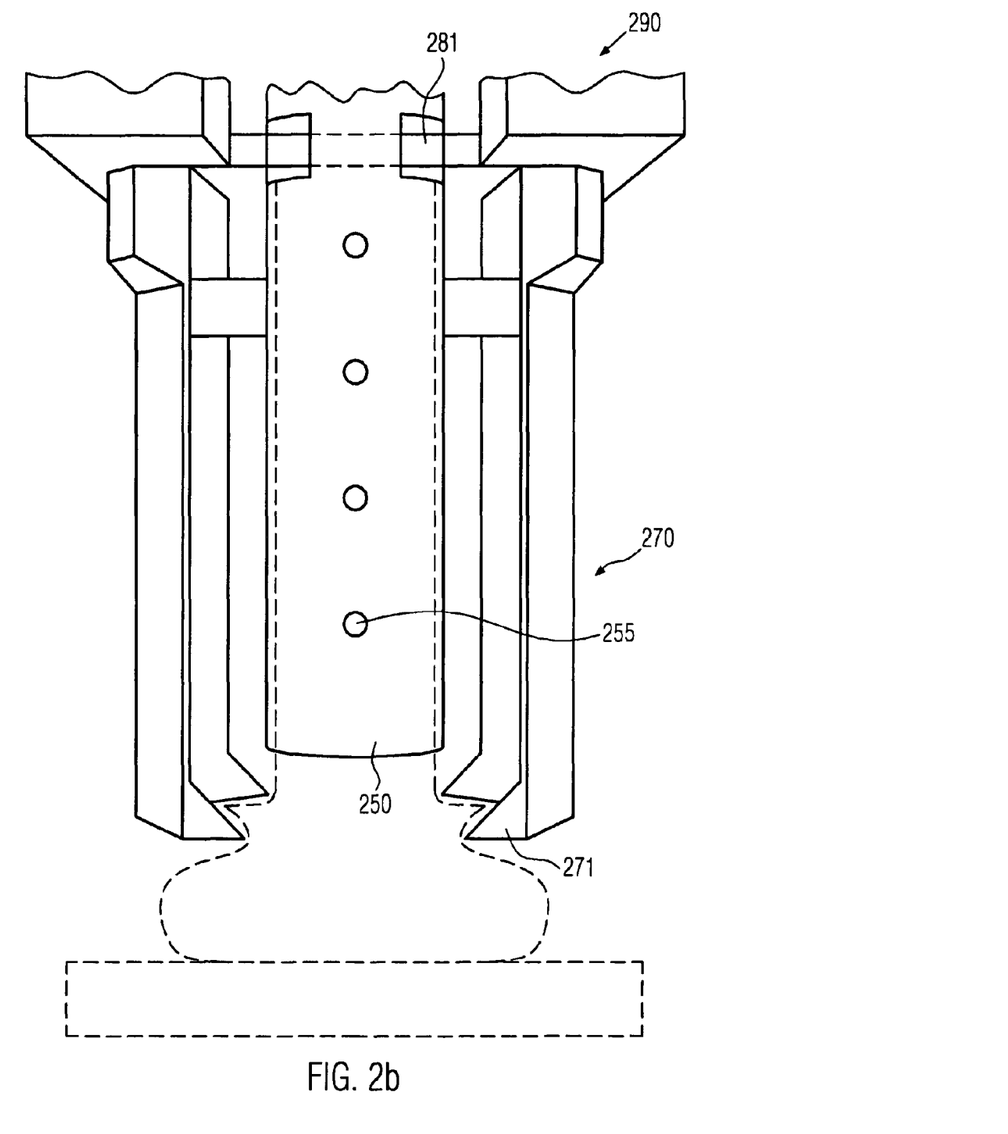

FIG. 2b shows a schematic representation of a top view of a part of the device 290, the contact surfaces 271 and the contact surfaces 281 which are in the coupled state in the present embodiment—said contact surfaces 271 and 281 thus representing a first gripping means and a second gripping means—being shown in an "open" condition, so that the device 290 can be positioned over the respective tubular area of a preform, as soon as the respective preform is available.

Figure 2C:
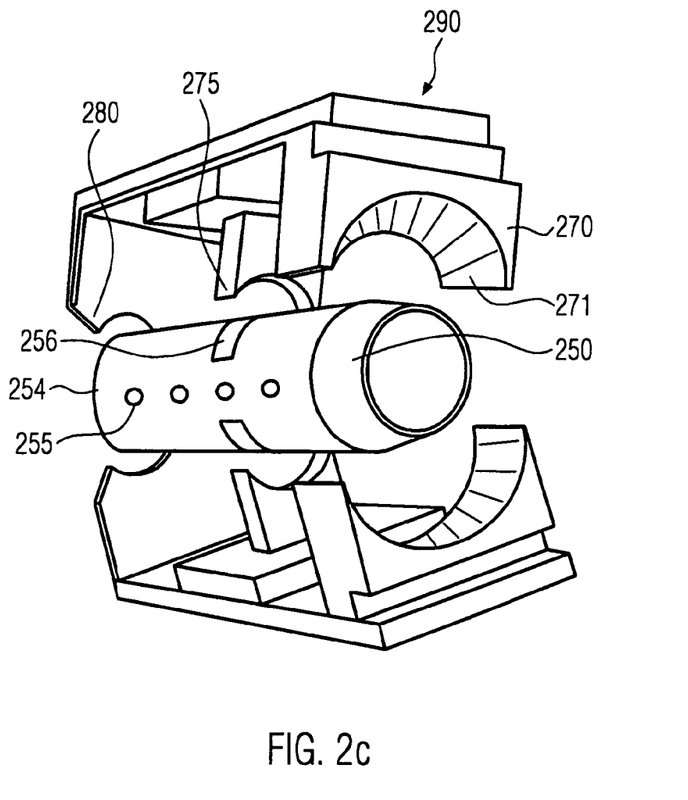

FIG. 2c shows a schematic perspective representation of the removal device 290 according to another illustrative embodiment in which the removal unit 270 with the respective contoured surfaces 271 is provided with a further gripping means 275 which, via respective contact surfaces, is adapted to be brought into contact with the material of the preform through appropriate openings 256 in the sleeve 254. Hence, the contact surfaces 271, the additional gripping means 275 and the means 280 are provided for contacting the preform directly, at least the contour of the surfaces 271 corresponding to that of the preform in the area in question, e.g. the head area. It follows that the removal device 290 is implemented for efficiently removing also preforms of comparatively great length from a respective mould element, since a comparatively strong axial force and also a high operating pressure can be built up in the preform, a maximum radial expansion being efficiently limited by the limiting device 250, as has been explained hereinbefore. In particular, the removal device 290 can have provided therein a fluid introduction means which is adapted to be moved relative to the end portion of the preform, as has e.g. be explained in connection with the means 160 according to FIG. 1h, so that a necessary high operating pressure can be built up.

Figure 2D:
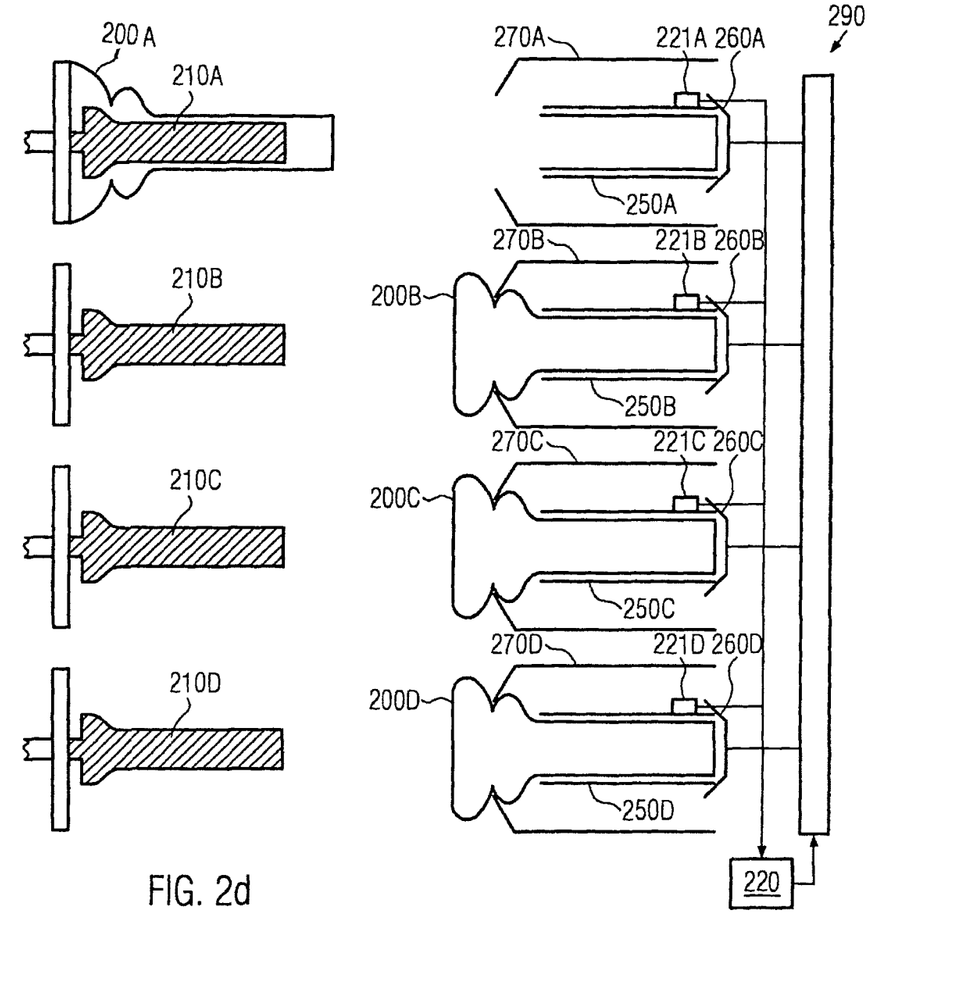
FIG. 2d shows schematically a device for processing a plurality of teat rubber preforms, a control unit being provided for supervising one or a plurality of process parameters.

FIG. 2d shows a schematic representation of the removal device 290 according to another illustrative embodiment in which a plurality of preforms 200a, . . . , 200d can be processed simultaneously. For this purpose, respective units of the device 290 are provided, each unit including a removal unit 270a, . . . , 270d, a limiting device 250a, . . . , 250d, and a fluid introduction means 260a, . . . , 260d. In addition, the removal device 290 has provided therein a control unit 220 which adjusts process parameters, e.g. the respective fluid operating pressure to be used in the individual units, and the magnitude of the axial force applied during the removal. This force can be selected such that it has the same magnitude for all units, when these units are mechanically coupled to one another in a rigid mode of connection, or it can be controlled individually; in this case, appropriate individually movable actuator units are provided. In addition, some embodiments can be so conceived that a relative movement of the respective fluid introduction means 260a, . . . , 260d is individually controllable, as has been described e.g. in connection with the fluid introduction means 160 in FIG. 1h. In accordance with another illustrative embodiment, one or a plurality of sensor elements 221a, . . . , 221d is/are provided and positioned such that the presence of a preform in the respective units of the removal device 290 can be detected by means of the control unit 220. The sensor units 221a, . . . , 221d may e.g. record suitable values, such as the temperature, optical characteristics, electric characteristics, acoustic characteristics (ultrasound) and the like, which allow conclusions to be drawn with respect to the presence or the absence of a respective preform.

When the removal device 290 is in operation, the respective limiting devices 250a, . . . , 250d are adequately positioned over the preforms 200a, . . . , 200d, which adhere to the respective mould elements 210a, . . . , 210c after the production, and the removal units 270a, . . . , 270d are activated in interaction with the fluid introduction means 260a, . . . , 260d so as to initiate the above-described removal process. Following this, an axial movement of the device 290 is executed for removing the respective preforms 200a, . . . , 200d. After the removal process, the respective preforms 200a, . . . , 200d can be conveyed, e.g. by means of the device 290, to a suitable transfer site where the preforms are collected and subjected to further processing. It is, for example, possible to adequately adjust the final material characteristics of the preforms 200a, . . . , 200d by a subsequent heat treatment so that the final molecular structure of the polymer material, e.g. of the silicone, will be obtained. The heat treatment can be executed for a plurality of preforms at the same time, so that the process throughput during the production of the respective teat rubbers only depends on the capacity of the respective injection moulding system. Hence, a plurality of preforms can be processed simultaneously. If necessary, the process conditions can be adjusted individually, if e.g. the individual units of the removal device comprise individually controllable components, such as valves for the fluid pressure, mechanical actuators, etc.

During the removal process, different degrees of adhesion between the respective preforms and the mould element in question may occur due to differences in the process, so that one or a plurality of removal processes may perhaps fail. In the example shown, the preform 200a is not successfully removed. In the case of one embodiment, the absence of the preform 200a in the device 290 is detected on the basis of the sensor element 221a via the control unit 220. The control unit then executes an appropriate correction function in accordance with a predetermined operational sequence, said correction function consisting e.g. in a report to the operator of the system 290. In accordance with another illustrative embodiment, the removal process is repeated, when the removed preforms 200b, . . . , 200d have been transported away. One embodiment is e.g. so conceived that units of the removal device 290 which are not needed can be deactivated by the control unit 220, whereas special process parameters can be applied to the removal unit 270a and the fluid introduction means 260a. For example, the control unit 220 can cause an increase in the operating pressure of the fluid introduced by the means 260, so as to increase the efficiency of the removal process. Following this, the removal of the preform 200a can be executed, and, if also this attempt should fail, additional corrective measures can be taken. The finally removed preform 200a can then be conveyed or rejected, if, due to the parameter adjustment used during the removal process, it must be expected that damage may have been caused to the preform 200a. Since the removal process and the subsequent conveying process for depositing the preforms are normally much shorter than the respective preform production process, even an unsuccessful removal of one of the preforms will only result in a minor reduction of the overall throughput, so that a high overall throughput can be maintained while guaranteeing simultaneously a high degree of automation and operational reliability.

It follows that, according to the present invention, pressure is applied when the teat rubber preforms are removed during the production of teat rubbers, in particular of teat rubbers containing a high percentage of silicone, the radial expansion of teat rubber areas being appropriately limited to a maximum value. Hence, the removal can be executed automatically and at a comparatively high temperature without irreversible damage being caused to the material. The removal process can be supported by an appropriate contact surface whose contour corresponds, at least partially, to the outer contour of the preform.

What is claimed is:

1. A method of producing a preform of a teat rubber with a head area and an adjoining tubular area having a longitudinal axis, said method comprising
   forming a preform of the teat rubber from a heated polymer material mixture by means of a mould and
   removing the preform from a mould element, which determines, at least partially, the inner contour of the teat rubber, by introducing pressurized fluid into the tubular area and by simultaneously limiting a radial expansion of the tubular area, caused by the fluid pressure, to a predetermined range, wherein the removal of the preform additionally comprises:
   bringing a part of the preform into contact with a contact surface adapted to the contour of said part of the preform, and applying an axial pulling force in the direction of the longitudinal axis of the adjoining tubular area by means of the contact surface.

2. A method according to claim 1, wherein said limiting of the radial expansion is effected by providing a sleeve enclosing the tubular area, at least partially, with a specified gap.

3. A method according to claim 2, wherein the contact surface constitutes part of the inner surface of the sleeve.

4. A method according to claim 1, wherein the radial expansion is limited to 20 mm or less.

5. A method according to claim 4, wherein the radial expansion is adjusted to 0.5 mm or more.

6. A method according to claim 1, wherein, for improving the sealing characteristics, at least an end portion of the tubular area is mechanically fixed in the radial direction during the introduction of the fluid.

7. A method according to claim 1, wherein at least the head area has a force applied thereto by a gripping unit during introduction of the fluid.

8. A method according to claim 1, wherein, for introducing the fluid, a nozzle provided with a sealing surface is moved to the end portion of the tubular area and pressed onto said end portion.

9. A method according to claim 1, further comprising the step of baking out the teat rubber preform for adjusting the material characteristics of the teat rubber after the removal process.

10. A method according to claim 1, wherein gas displaced during the expansion of the tubular area is discharged through gas outlets.

11. A method according to claim 10, wherein an effective area of the gas outlets is adapted such that the material of the preform bulges into the gas outlets, without any irreversible deformation of the bulging material being caused.

12. A method according to claim 1, wherein the polymer material mixture is a silicone mixture.

13. A method according to claim 1, wherein the preform has a temperature of 150° C. or more during the removal process.

14. A method according to claim 1, further comprising:
   controlling the fluid pressure and an axial force so that a predetermined range will be observed.

15. A method according to claim 14, further comprising:
   examining by means of a control unit whether the preform has been removed successfully and repeating the removal process, if the preceding removal process should have failed.

16. A method according to claim 15, wherein, during a repeated removal process, at least the fluid pressure will be increased.

17. A method according to claim 1, wherein an axial force is applied to the tubular area for compressing at least the tubular area, so as to support the removal of the material of the preform from the mould element.

* * * * *